(No Model.)

W. CABLE.
FISH HOOK.

No. 549,842.  Patented Nov. 12, 1895.

WITNESSES.
Matthew M. Blunt.
Samuel P. Thrasher.

INVENTOR.
Wheeler Cable
by A. H. Spencer
ATT'Y

UNITED STATES PATENT OFFICE.

WHEELER CABLE, OF BOSTON, MASSACHUSETTS.

FISH-HOOK.

SPECIFICATION forming part of Letters Patent No. 549,842, dated November 12, 1895.

Application filed November 16, 1894. Serial No. 529,020. (No model.)

*To all whom it may concern:*

Be it known that I, WHEELER CABLE, of Boston, in the county of Suffolk and State of Massachusetts, have invented a new and useful Improvement in Fish-Hooks, of which the following, taken in connection with the accompanying drawings, is a specification.

The object of my invention is to provide a fish-hook which will catch fish where any are to be found, and will not catch into eel-grass, lily-pads, and the like, although found on every hand.

My purpose has been to capture the wily pickerel or any equally game fish, and to hook him in the upper jaw so as invariably to land him, since that jaw has strength enough to hold the hook.

Again, my hook does not alarm the shyest of fish when they happen to strike its sides. Hence they are likely to return and take the bait and be taken.

The characteristic peculiarity of my fish-hook is that its curved body is loaded or weighted on the back or convex side, opposite to the hook-point, while a colored feather or similar light matter to attract the attention of the fish is bound to the stem of the hook and projects toward its barb above the weight. Hence, in trolling, the back of the hook takes the lowest position and the point is presented uppermost. In this position it cannot ordinarily catch into growing obstructions and foul the line, as I have fully demonstrated in my experience. I flatten the extreme back of the leaden weight that this position of the hook in a vertical plane may be better maintained.

In order not to frighten timid fish by their contact with the leaden weight, I prefer to cover it tightly with leather or some soft wrapping, the touch of which will not prove alarming. A close winding of twine will suffice. These coverings serve, also, to give a neat finished appearance to the weighted hook.

Figure 1:
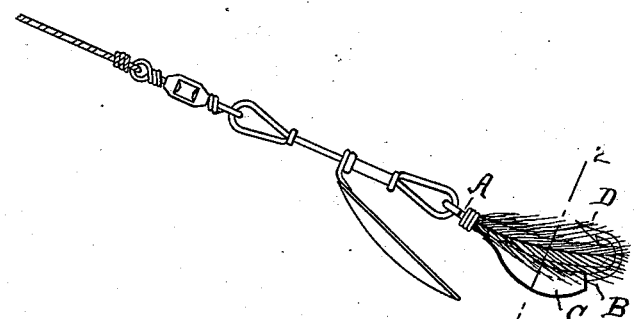
Figure 2:
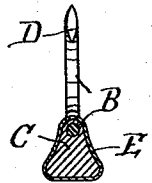

In the drawings, Figure 1 is a side view of my improved hook connected to the line in a well-known way. Fig. 2 is an enlarged cross-section taken through the covered weight on line 2 2 of Fig. 1.

The stem A of the hook is attached to the line in any ordinary way, preferably by a link and swivel, as shown, so that it will be entirely free to take the desired position. The body B of the hook is loaded on its back or convex portion with a leaden or other weight C, wired, cast, or compressed upon it, so as to permanently retain its place on the side opposite to the point and barb D, between the stem A and the sharp bend of the hook. This weight, as shown, tapers gradually from its thickened central part to the shank or stem A, so as to present no abrupt shoulder to catch weeds and the like when it is drawn through the water.

The enlarged section, Fig. 2, shows the back of the weight C flattened, as I prefer to make it, for this form tends to keep the point upward when the hook is drawn over lily-pads or any flat surface. A wrapping or covering E is also represented in this view, the advantage being, as stated, that a soft external surface is less likely to frighten the fish than rigid metal would be. This, however, is not essential.

The feather F extends in the line of draft toward the barb, as heretofore; but in my hook it serves as a float or buoy to keep the point up, while the opposed weight keeps the back down.

By my invention the point of the hook being always upward is not only unlikely to engage with the stems and leaves of water-lilies, &c., but, as intimated, it almost invariably takes the fish through the upper jaw and resists all his efforts to escape. In practice I can secure five times as many fish with my improved hook as can an equally-skillful angler in the same time with the best tackle heretofore known.

I am aware that the stems of fish-hooks have sometimes been weighted concentrically with lead to serve as a sinker; but this had no tendency to turn the hook-point upwardly in trolling or otherwise, and it is foreign to my invention.

Fish-hooks are on the market to which artificial baits are attached in form of a cray-fish, and perhaps other forms. This artificial bait may hold the hook with the barb uppermost under some circumstances, but is not specially adapted so to do, and as the bait has projecting arms or claws, if the hook becomes inverted, these projecting parts are liable to prevent the hook from turning over, and are themselves obstructions when moving through weeds and débris.

The weight attached to my hook is shaped to prevent entanglement with obstructions, and as it is almost entirely below the body of the hook it is certain to turn the hook into the desired position, and cannot under any known circumstances act as an obstacle to prevent the turning of the hook should the same be purposely dropped into the water barb downward.

I claim as my invention—

1. The fish hook described, consisting essentially of the curved body of wire barbed as usual and the weight permanently attached to the convex side of the body, the end of the weight rounding toward the shank of the hook, so as to maintain the barb of the hook uppermost and prevent snagging, substantially as described.

2. The combination with the wire body of a fish hook of usual construction, of the weight permanently secured to the convex side of the hook to retain the barb uppermost and prevent fouling, and the feather float attached to the concave side of the hook for a similar purpose, all substantially as described.

3. As an improved article of manufacture, a fish-hook provided with a light weight fixed to the back side of its convex body, opposite to the barb, a close fitting cover inclosing such body and weight only, and a feather or like float bound to the stem and extending between said weight and barb, substantially as and for the purpose set forth.

In testimony whereof I have signed my name to this specification, in the presence of two subscribing witnesses, on this 31st day of October, A. D. 1894.

WHEELER CABLE.

Witnesses:
    A. H. SPENCER,
    CHARLES G. KEYES.